United States Patent [19] [11] 4,167,237
Hayashi [45] Sep. 11, 1979

[54] PRESSURE FEEDER INCLUDING PUSHER ASSEMBLIES

[76] Inventor: Torahiko Hayashi, 3-4, Nozawa-machi, Utsunomiya-shi, Tochigi-ken, Japan

[21] Appl. No.: 854,908

[22] Filed: Nov. 25, 1977

[30] Foreign Application Priority Data

Nov. 27, 1976 [JP] Japan ............ 51-142760

[51] Int. Cl.[2] ............ G01F 11/00

[52] U.S. Cl. ............ 222/265; 222/280; 222/404

[58] Field of Search ............ 222/233, 238, 236, 252, 222/280, 281, 272, 265, 404, 385; 425/239, 449

[56] References Cited

U.S. PATENT DOCUMENTS

| | | | |
|---|---|---|---|
| 2,157,192 | 5/1939 | Thurlings | 425/335 |
| 3,615,044 | 10/1971 | Bonneric | 222/280 |
| 4,084,263 | 4/1978 | Millauer | 366/84 |
| 4,113,819 | 9/1978 | Hayashi et al. | 264/173 |

FOREIGN PATENT DOCUMENTS

| | | | |
|---|---|---|---|
| 2123190 | 11/1972 | Fed. Rep. of Germany | 222/280 |

*Primary Examiner*—Robert J. Spar
*Assistant Examiner*—Charles A. Marmor
*Attorney, Agent, or Firm*—Guy W. Shoup; Gerard F. Dunne

[57] ABSTRACT

A pressure feeder for feeding solid or semi-solid material plastic in nature from a container into or through a relatively narrow outlet, comprising a container for the material with an outlet at the bottom thereof, a hollow cylindrical pusher member oval-shaped in cross-section and having a gear along the inner periphery thereof, a driven pinion gear mounted on the container and inserted in the pusher member, and a holder fixedly mounted on the container so as to hold the pusher member between it and the pinion gear. The pusher member carries out repeatedly a linear movement followed by a turn about the pinion gear.

8 Claims, 6 Drawing Figures

PRESSURE FEEDER INCLUDING PUSHER ASSEMBLIES

The present invention relates to a pressure-type feeder, and more particularly, to a feeder used to feed into or through a relatively narrow space plastic materials, especially those which are solid or semi-fluid, such as butter, bean jam, dough for bread and cake if examples are taken from food materials. The feeder of the present invention, may, for instance, be advantageously used for feeding materials to screw feeders or extruders. It may also be advantageously provided near the outlets of funnels. Various other usages may be conceivable.

In case plastic materials are to be fed into a screw feeder, the operation requires special attention, because the materials tend to adhere to the walls of the hopper or the screws tend to kick back the material. These phenomena make it difficult to have the screws to receive the material. Thus, it becomes necessary to have an operator attend the machine and to press manually the material repeatedly onto the screws so that the latter can receive the material.

The present invention has resolved the above difficulties by means of a simple mechanical device. The present invention consists of a pressure feeder for feeding solid or semi-fluid material plastic in nature from a container into or through a relatively narrow space, comprising a container for the material, with an outlet at the bottom thereof, and a pusher assembly consisting of a hollow cylindrical pusher member oval-shaped in cross-section and provided with a gear along the inner periphery thereof, a driven pinion gear rotatably mounted on the container, and a holder fixedly mounted on the container at a position spaced apart from said pinion gear the distance of the wall of said pusher member, said pusher member being placed so that said pinion gear comes within the hollow portion thereof and in meshing engagement with the gear of the pusher member and is simultaneously supported from the exterior by said holder, thereby to carry out repeated movement consisting of a linear movement followed by a turning movement about said pinion gear.

An object of the present invention is to provide a device enabling plastic material to be readily fed into or through a narrow space.

Another object of the present invention is to provide a device for feeding plastic material smoothly and continuously into a feed screw device.

The above, and other objects, features and advantages of the present invention will be apparent in the following detailed description of illustrative embodiments thereof which is to be read in connection with the accompanying drawing wherein.

Figure 1:
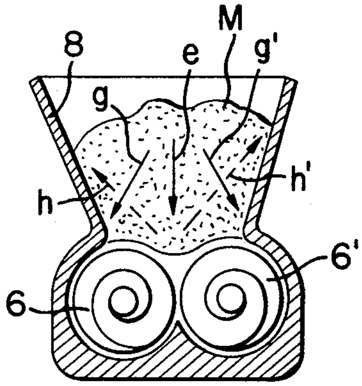
FIG. 1 PRIOR ART
FIG. 1 is a view in cross section of a conventional device.
Figure 2:
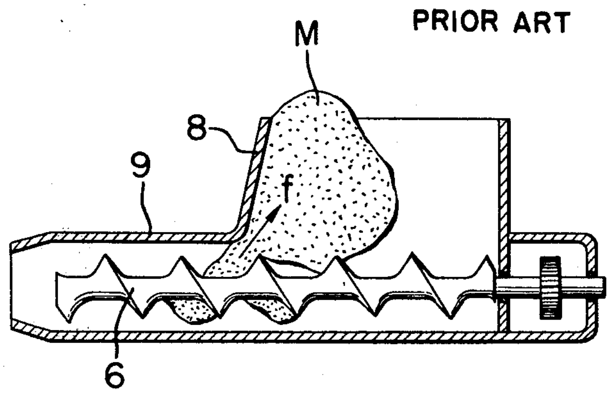
FIG. 2 PRIOR ART
FIG. 2 is a view of the device of FIG. 1 taken in longitudinal section.

In FIGS. 1 and 2, a conventional screw feeder combined with a hopper is illustrated. A pair of screws (6, 6') are juxterposed horizontally in a screw housing (9). A hopper (8) is provided above and adjacent to the screw housing (9), and the bottom of the hopper (8) is open to the interior of the screw housing (9) and is communicable therewith. Material (M) such as butter and dough is fed through the hopper (8) into the screws (6, 6') in the screw housing (9). The screws are arranged to be driven so as to receive the material and feed it through the gap between the screws and the inner walls of the screw housing and discharge it continuously through the outlet. When material (M) is placed into the hopper (8), it tends to move vertically downwardly as shown in FIG. 1 by an arrow e. However, when the material comes into contact with the side walls of the hopper (8), it tends to stick to the walls, and due to friction generated between the walls and the material, forces as shown by the broken lines h, h' are generated so as to have the material resist free and unobstructed downward movement. Because of these forces h, h', the material positioned near the walls tends to move in the direction indicated by the arrows g, g'. These movements of the material makes it difficult to feed the material smoothly into the screws. Further, the material, when trapped by the side walls, tend to create a "bridging" phenomenon, whereby the material tends to form a bridge overhead the screws, thus refusing to be freely received by the screws. Again, in this type of construction, when the material (M) is about to leave the hopper (8) and to move into the forward or the downstream portion of the screw housing (9), as shown in FIG. 2, the portion of the material received by the screws tends to move upwardly along the forward end wall of the hopper (8) in the direction as shown by the arrow f. This phenomenon is caused by the inevitable positional relationship between the forward end wall of the hopper and the screws, and when the material is made to advance by the rotation of the screws, the material pinched between the screw threads and the bottom portion of the forward end wall of the hopper tends to stick to the wall and instead of being pushed in the direction of the discharge opening of the screw housing, the material tends to rise up along the surface of the wall. The portion of the material thus stuck onto the surface of the wall tend to increase while the screws are driven, and to obstruct the free flow of the material into the screws.

The above described phenomena prevent the supply of the material into the screws in an adequate amount and the discharge of the material from the screw (6) becomes unsteady. In the past, this difficulty has been removed manually. Operators have been required to remove the mass of the material stuck to the inner wall of the hopper and push it into the screw housing by hand, so as to maintain a regular and continuous discharge of the material. This mannual operation is not only troublesome, but is also hazardous because of the possibility of contacts of human body with the screws in operation.

Figure 3:
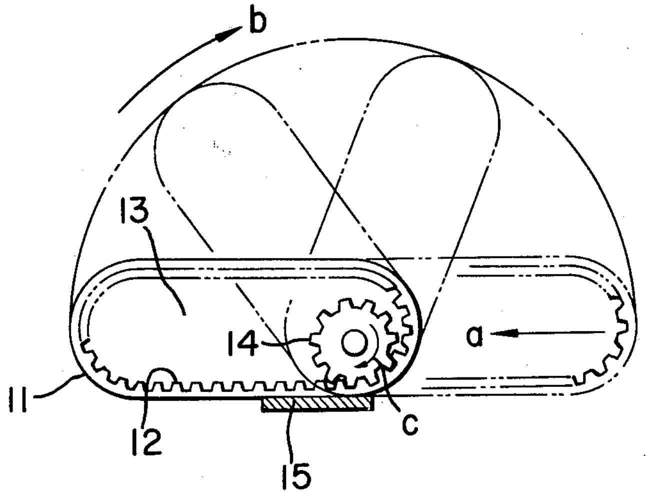
FIG. 3 is a front view of an embodiment of the present invention and illustrates the movements thereof.

The pressure feeder of the present invention takes the place of the mannual operation required in the conventional device. In FIG. 3, a pusher assembly is illustrated. It comprises a pusher member (11), a pinion gear (14) and a holder (15). The pusher member (11) is a hollow cylindrical body, oval-shaped in cross-section. It may be made of any material suited for the present purposes, including steel and synthetic resins. In the inner surface of the pusher member is provided a gear (12) around the entire surface thereof. The pusher member (11) is inserted between a pinion gear (14) and a holder (15). The pinion gear (14) is fixedly positioned in the interior of the hollow portion of the pusher member (11) and is in mesh with the gear (12) of the pusher member (11). The pinion gear (14) is driven in the clockwise direction in FIG. 3, as shown by the arrow c. The holder (15) supports the pusher member (11) from underneath in a sliding relationship, and is positioned fixedly so as to hold the pusher member (11) in such a manner that the gear (12) of the pusher member (11) meshes with the pinion gear (14) adequately.

Figure 4:
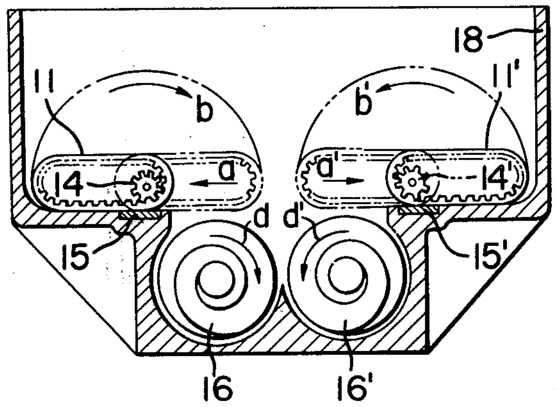
FIG. 4 is a cross-sectional view of a screw feeder equipped with a hopper and the pressure feeder of the present invention.
Figure 5:
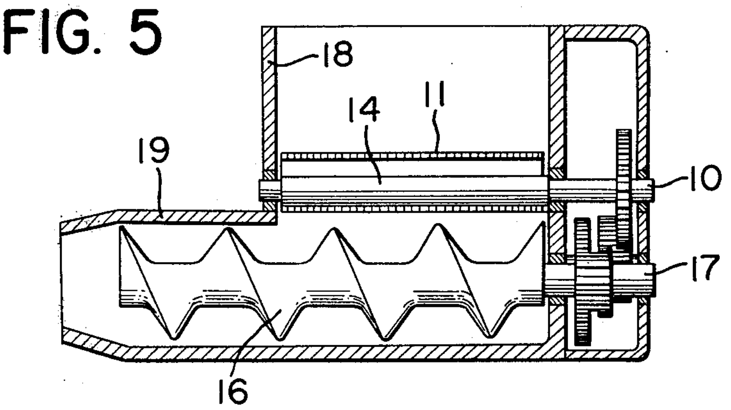
FIG. 5 is a view of the device of FIG. 4 taken in longitudinal section.

In FIG. 4, a hopper (18) communicates with a pair of screws (16, 16') positioned in a screw housing positioned underneath the hopper (18). The structure of the hopper, the screws and the screw housing is similar to the conventional device shown in FIGS. 1 and 2, except that the hopper is substantially larger in relation to the screws and the screw housing and the hopper is provided with two bottom portions laterally and horizontally extending over the lever just above the screws, leaving an opening between the two bottom portions for communication with the screw housing. On each of these bottom portions is provided a pusher member (11 or 11') as described above. The pusher member (11, 11') may be formed so that its lateral dimension is substantially the same as the lateral length of a bottom portion as shown in FIG. 4, and its longitudinal dimension extends over the interior of the hopper as shown in FIG. 5. A holder (15, 15') is fixedly mounted on each bottom portion, at a position adjacent to a screw. The shaft (10) of a pinion gear (14 or 14') is rotatably mounted on the forward and rearward end walls of the hopper as shown in FIG. 5. It is positioned above the holder (15, or 15') in such a manner as to hold the pusher member (11 or 11') in coaction with the holder. Thus, the holder (15 or 15') holds the pinion gear and the pusher member in position so that they may not come out of mesh from each other. Near the rear end of the shaft (10) of the pinion gear (14 or 14') is mounted a gear to be connected to a driving means (not shown).

Each of the screws (16, 16') is mounted about a shaft (17), which is mounted in the rear end wall of the screw housing and is provided with gears to be connected to a driving means (not shown). The shafts (10) of the pinion gears (14, 14') and the shafts (17) of the screws (16, 16') may be connected via the gears mounted respectively thereon and additional gears to adjust the directions of rotation of these shafts.

In FIGS. 3 and 4, the pinion gear (14) is arranged to rotate in the clockwise direction as indicated by the arrow c. When the pinion gear (14) is made to rotate, the pusher member (11), which is placed at the position indicated by the phantom lines, is caused to move horizontally in the linear direction indicated by the arrow a, so as to move away from the screws. When the rotation of the pinion gear (14) moves the pusher member (11) to the position where it cannot continue its horizontal movement any further, the rotation of the pinion gear (14) causes the pusher member (11) to turn about the right end thereof as seen in FIGS. 3 and 4, due to the meshing relationship between the pinion gear (14) and the portion of the gear (12) at the right end of the pusher member as seen in FIGS. 3 and 4. The direction of the turning motion of the pusher member (11) is illustrated in FIGS. 3 and 4 by the arrow b. The pusher member carries out its turning movement at the angle of 180°, and returns to its position before it commences its horizontal linear movement. The pusher member (11') conducts a similar movement except that the direction of movement is opposite to that in case of the pusher member (11), since the pinion gear (14') is made to rotate counterclockwise. In some cases, it is preferable that the movements of the two pusher members are synchronized so that when the pusher member (11) is positioned at its extreme right position, the pusher member (11') may preferably be at its extreme left position. The construction and the movement of the screws (16, 16') may be conventional. As shown in FIG. 4, the screw (16) rotates clockwise and the screw (16') rotates counterclockwise.

In operation, when material (M) is fed into the hopper (18), a bulk of the material comes into contact with the screws when the pusher members are positioned away from the screws. The material which tends to stick to the walls of the hopper or show the bridging phenomenon may be guided by the recurring rotational movement of the pusher members (11, 11') into the screws housing to be received and forwarded by the screws (16, 16').

Viewed from a different angle, the device of the present invention is advantageous, especially in connection with the above embodiment in use for the above application, because it helps increase the capacity of the hopper. As seen in FIG. 1, the side walls of the hopper (8) are inclined so as to gradually converge in the direction of the screws and the width of the bottom of the hopper (8) is substantially smaller than the width of the screw housing. The construction has been necessary for the conventional device so as to allow the material to move downwardly into the screw housing, even though the friction between the material and the walls is a deterrent against the smooth feeding of the material. If the walls are vertical, the friction would be minimized. However, the hopper capacity would be too small if the walls are erected on vertical planes extending from the bottom ends of the walls in FIG. 1. Again, if the walls are made to retreat to increase the capacity of the hopper, so long as the size of the screws is not enlarged, shoulders likes those shown in FIG. 4 must be provided and they act as a deterrent against the smooth feeding of the material. Naturally, it is desirable to have a larger-capacity hopper for convenient operation. The structure of the conventional device is formed as the result of a compromise between a need for the above two considerations.

However, if the pressure feeder of the present invention are used, the above difficulties inherent in larger hoppers with vertical walls are eliminated.

Figure 6:
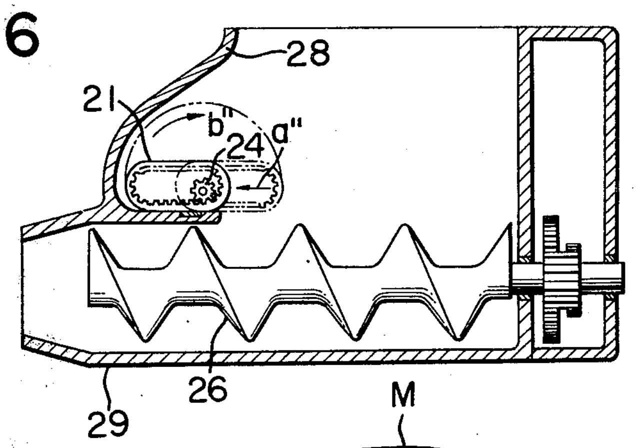
FIG. 6 is a view of a similar device in longitudinal section equipped with the pressure feeder of the present invention in a different mode of application.

In FIG. 6, a pressure feeder of the present invention is positioned in the hopper (28) above the screws (26) in the screw housing (29) laterally of the axes of the screws, along the forward end wall of the hopper. The pressure feeder in FIG. 6 is identical in structure to any of the pressure feeders shown in FIG. 4.

A pusher member (21) is positioned between a pinion gear (24) and a holder mounted on a horizontal cantilever projection which serves to separate the frontal portion of the hopper (28) from the screw housing (29). The pusher member (21) carries out a horizontal linear movement as shown by the arrow a'' and then turns around the pinion gear (24) in the direction shown by the arrow b″ and repeats the above cycle. When it starts the horizontal linear movement, the pusher member (21) overhangs a portion of the screws, and along with the advance of the horizontal movement, it retreats from the screws and at the end of the horizontal movement it completely rides on the cantilever projection. By the turning movement about the pinion gear (24), the pusher member (21) removes the material stuck to the forward end wall portion of the hopper (28) and urges it to progress into the screw housing (29) to be received by the screws (26). The above application of the present invention is especially effective in case the material tends to strick to the forward end wall portion of the hopper, guided by the screw threads, and accumulate thereon.

Figure 7:
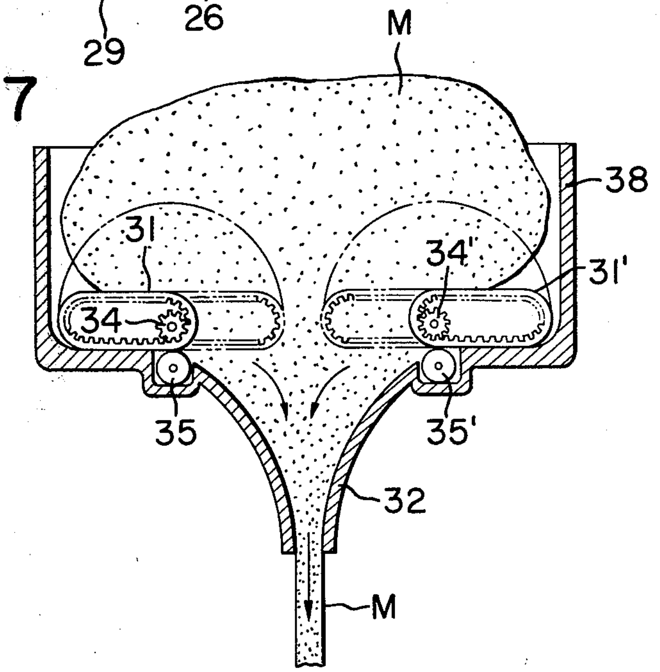
FIG. 7 is a view in cross-section of a funnel combined with a hopper and a different embodiment of the pressure feeder of the present invention.

Another embodiment is shown in FIG. 7, wherein the hopper (38) is similar in construction to the hopper (28) in FIG. 4, but it is provided with a funnel (32), instead of a screw housing, at the bottom thereof. The pressure feeders of this embodiment are similar in construction to this in FIG. 4, except for the holders (35, 35′). The pusher member (31, 31′) carry out cycles consisting of horizontal linear movements followed by rotational movements about pinion gears (34, 34′) and the material (M) is urged to proceed to the funnel (32) and discharged therefrom in the direction as shown by the arrows in FIG. 7.

The holders (35, 35′) are in the form of free-rotatable rolls. The function of the holders (35, 35′) is similar to those shown in FIGS. 3 and 4. When the pusher members move by the rotation of the pinion gears, the rolls (35, 35′) hold the pusher members in place by sliding engagement therewith in such a manner that the pinion gears (34, 34′) are in constant engagement with the pusher members.

A variety of modifications may be made to the pressure feeder of the present invention without any deviation from the scope of the claims of the present application. For instance, only a single pusher assembly may be equipped with the container. The pusher assembly may be provided on a vertical side wall of the container. A pusher assembly may be provided on the vertical surface of each of the two opposite side walls. When two pusher assemblies are provided in one container, their movements may not necessarily be synchronized and it may be arranged that they operate to urge the flow of the material alternately.

What is claimed is:

1. A pressure feeder for feeding solid or semi-fluid material plastic in nature from a container into or through a relatively narrow outlet, comprising a container for the material, with an outlet at the bottom thereof, and a pusher assembly comprising a hollow cylindrical pusher member oval-shaped in cross-section and provided with a gear along the inner periphery of the wall thereof, a driven pinion gear rotatably mounted on the container, and a holder fixedly mounted on the container at a position spaced apart from said pinion gear a distance equal to the width of said wall of said pusher member, said pusher member being placed so that said pinion gear comes within the hollow portion thereof and in meshing engagement with the gear of the pusher member and is simultaneously supported on the outer periphery of said wall by said holder, thereby to carry out repeated movement consisting of a linear movement followed by a turning movement about said pinion gear.

2. A pressure feeder in accordance with claim 1, wherein said holder is a free-rotatable roll.

3. A pressure feeder in accordance with claim 1, wherein the container is provided with a substantially rectangular bottom having side walls extending oppositely from said outlet, there being two of said pusher assemblies each provided adjacent a respective side wall of the container, the direction of rotation of the pinion gear in one assembly being opposite to that of the pinion gear in the other assembly so as to cause the pusher members to turn around the respective pinion gears in the direction to urge the flow of the material through the outlet.

4. A pressure feeder in accordance with claim 3, wherein said holder is a free-rotatable roll.

5. A pressure feeder in accordance with claim 1, wherein the container is provided with a substantially rectangular bottom having an opening extending therethrough and two separate bottom portions, said bottom portions extending oppositely from said opening and each being adjacent to a respective one of the side walls of the container, therebeing two of said pusher assemblies each being provided adjacent a respective one of the bottom portions, said opening being connected to said outlet, and the direction of rotation of the pinion gear in one assembly being opposite to that of the pinion gear in the other assembly so as to cause the pusher members to turn around the pinion gears in the direction to urge the flow of the material through said opening and into or through the outlet.

6. A pressure feeder in accordance with claim 5, wherein said holder is a free-rotatable roll.

7. A pressure feeder in accordance with claim 1, wherein the container is provided with a substantially rectangular bottom and said bottom is provided with an opening extending in one direction accross the bottom, and said pusher assembly is provided adjacent to a wall of the container extending laterally of the direction of the opening.

8. A pressure feeder in accordance with claim 7 wherein said holder is a free-rotatable roll.

* * * * *